June 12, 1934.  J. G. BOUSLOG  1,963,046
CELLAR CASING HEAD FLANGE
Filed Jan. 14, 1933
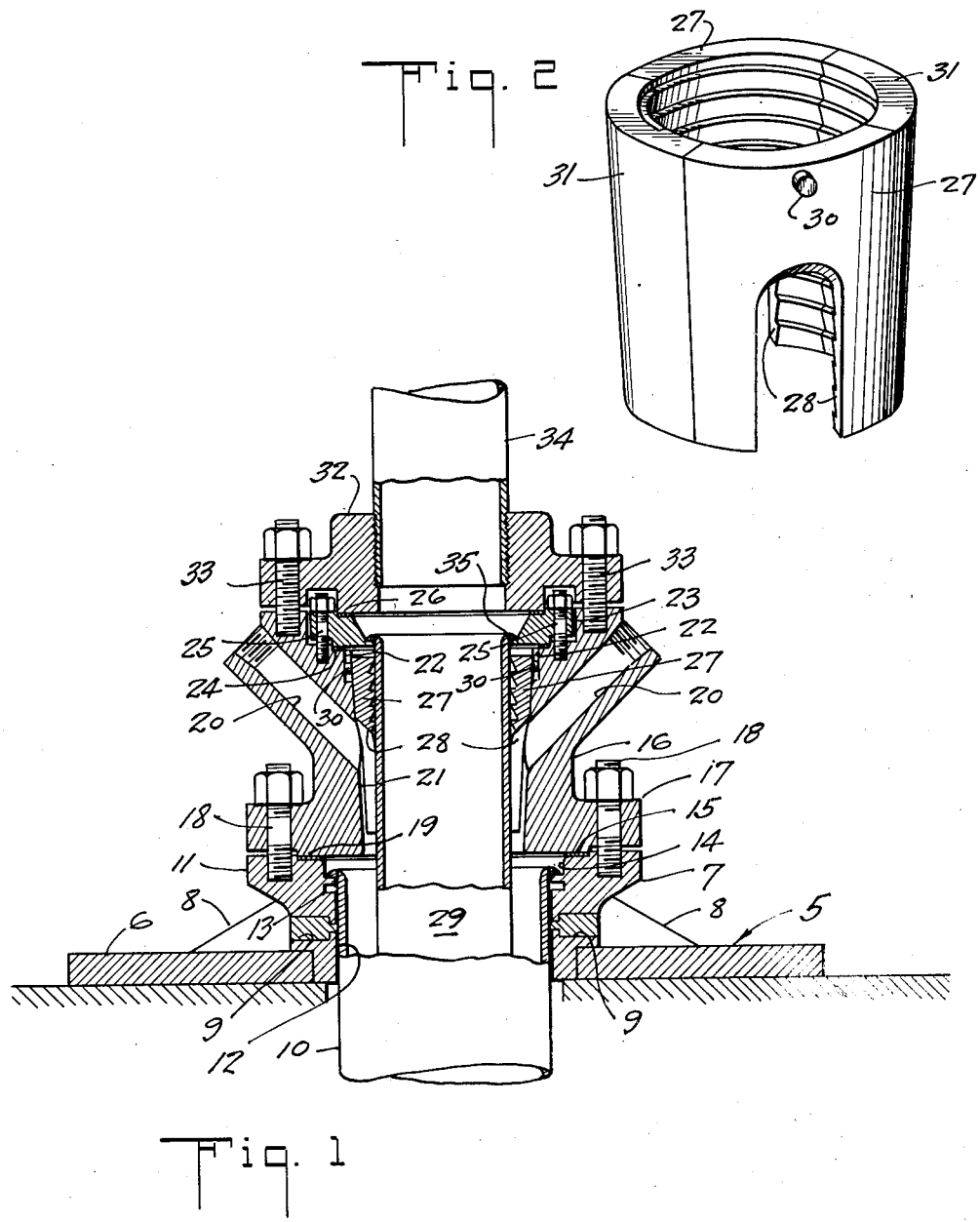
INVENTOR
John G. Bouslog
BY Ernest L. Wallace
ATTORNEY

UNITED STATES PATENT OFFICE 1,963,046

CELLAR CASING HEAD FLANGE

John G. Bouslog, Compton, Calif., assignor to Oscar Kezer Stephens, San Gabriel, Calif.

Application January 14, 1933, Serial No. 651,746

3 Claims. (Cl. 166—14)

This invention relates to cellar casing head flanges and pertains to a flange structure wherein the longitudinal length of the head may be made short as compared with heads heretofore used.

The present invention has for its objects the following features:—Provision of a flange enabling attachment of casing thereto by a welded joint as described and claimed in my application for Casing heads filed June 20, 1932, Serial No. 618,245; the provision of a slip and body structure with relief passages at the slips enabling shortening of the length of the flange; and the provision of a flange and slip structure having relief passages extending into the slips and body.

These objects are accomplished by means of the embodiment of my invention illustrated in the accompanying drawing, in which:—

Fig. 1 is an axial section through a casing head; and Fig. 2 is a perspective view of the slips in assembled relation.

Referring more particularly to the drawing, a base is denoted by 5 and may comprise a ring like member 6 having a tubular portion 7 set therein. Strengthening ribs 8 extend from the tubular portion 7. The ring like member 6 and tubular portion 7 may be welded together to form an integral base. The structure just described is so constructed as a mechanical convenience and the base may be cast integral if desired. Openings 9 are provided in portion 7 to enable spot welding to outer casing 10. The base is provided at the top with a flange 11 provided with tapped bores to receive bolts. The bore 12 of the base is substantially cylindrical having an annular recess 13 above which is a counterbore 14. The wall between recess 13 and counterbore 14 is made substantially the thickness of the casing 10. A marginal recess for a gasket 15 is provided on the upper face of the base.

The body 16 is mounted on the base and is provided with a lower flange 17 having bolt holes for registration with the tapped bores in flange 11 of the base. Bolts 18 are provided to secure the body to the base. The lower face of flange 17 is offset downwardly as indicated by 19 to engage gasket 15 and clamp the latter so as to provide a seal. There are two relief ways 20 tapped for attachment of pipe and extending laterally upward from their mouths in the bore of the body. The bore 21 of the body is tapered to form a seat for slips. Longitudinal recesses 22 are formed at the top of bore 21 to receive alinement pins on the slips. The top marginal edge of bore 21 is recessed to form a seat for a casing collar 23. At the inner margin of the recess is an annular depression for a gasket 24. The ends of the bore of collar 23 are tapered and formed with steps. Bolt holes are provided in collar 23 and tapped holes in the body 16 for bolts 25. In the upper step is a gasket 26.

Seated on the body are slips. Four are shown. Two of the oppositely disposed slips 27 are cut away as indicated by 28. These cut aways are registered with the mouths of ways 20 and serve for communication of the ways with the space between outer casing 10 and inner casing 29 held by the slips. Pins 30 on the slips 27 are received in recesses 22 to provide for alinement of cut outs 28 with the mouths of ways 20. Slips 31 are of the usual form.

A top 32 has bolt holes for registration with tapped bores in the body to receive bolts 33 and fasten the top 32 to body 16. The bore of top 32 is threaded to receive an extension pipe 34.

The casing 10 is landed in the base. A weld is made between casing 10 and the base by molten metal placed in recess 14. A good weld will be formed as the stock in casing 10 and the wall between recesses 13 and 14 are of the same thickness allowing the same temperature to be simultaneously attained by both. The weld forms a seal between the base and casing 10. Body 16 is then bolted to the base, slips 27 and 31 placed in the body and casing 29 landed therein. Collar 23 is placed about casing 29 and resting on the slips, gasket 24 being in place. The collar is bolted to the body 16, and casing 29 welded to the collar at 35. A seal is thus provided between casing 29 and the body. The lip of collar 23 on which the weld 35 is made is substantially of the same thickness as the stock of casing 29. Next the top 32 is placed in position and fastened to the body 16 by bolts 33. Extension pipe 34 is secured to the top. Relief pipes may then be secured to the body to communicate with ways 20. The parts are then assembled.

What I claim is:—

1. A cellar casing head flange comprising a base adapted to have casing landed therein, a body mounted on said base for support of inner casing, said body having a tapered bore extending therethrough to form a seat for slips, there being relief passages in said body communicating with said bore and passing laterally through said body, slips seated in said bore, the slips registering with the mouths of said passages being cut out to provide ways extending to the bottom of said slips for communication of said passages with the annular space between casings, the upper face of said body being recessed at the margin of said bore, a casing collar seated in said recess above said slips, means securing said collar and body together, casing held by said slips and initially forming a slip joint therewith, said casing being welded to said collar to form a seal.

2. A cellar casing head flange comprising a base adapted to have casing landed therein, a body mounted on said base for support of inner casing, said body having a tapered bore extending therethrough to form a seat for slips, there being a relief passage in said body communicating with said bore and passing laterally through said body, slips seated in said bore, the slip registering with the mouth of said passage being cut out from the bottom to provide a way for communication of said passage with the annular space between casings, the upper face of said body being recessed at the margin of said bore, a casing collar mounted in said recess above said slips, means securing said collar and body together, casing held by said slips and initially forming a slip joint therewith, said casing being welded to said collar to form a seal.

3. A cellar casing head flange comprising a base adapted to have casing landed therein, a body mounted on said base for support of inner casing, said body having a tapered bore extending therethrough to form a seat for slips, there being relief passages in said body communicating with said bore and passing laterally through said body, slips seated in said bore, the slips registering with the mouths of said passages being cut out to provide ways extending to the bottom of said slips for communication of said passages with the annular space between casings, a casing collar mounted on said body above said slips, means securing said collar and body together, and casing held by said slips and initially forming a slip therewith, said casing being welded to said collar to form a seal.

JOHN G. BOUSLOG.